United States Patent
Nakai et al.

(10) Patent No.: US 6,253,248 B1
(45) Date of Patent: Jun. 26, 2001

(54) INFORMATION PROCESSING APPARATUS AND METHOD

(75) Inventors: Akiya Nakai, Tokyo; Takeshi Baba, Kawasaki; Masahiko Shirai, Yokohama; Shuji Yamoto, Machida; Tokuko Kanda, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/095,073

(22) Filed: Jun. 10, 1998

(30) Foreign Application Priority Data

Jun. 13, 1997 (JP) .................................................. 9-156938

(51) Int. Cl.[7] .................................................. G06F 15/16
(52) U.S. Cl. .......................... 709/237; 709/217; 707/507
(58) Field of Search .................................... 709/203, 230, 709/216, 226, 246, 217, 219, 237; 707/507, 508

(56) References Cited

U.S. PATENT DOCUMENTS

| | | | | |
|---|---|---|---|---|
| 5,727,159 | * | 3/1998 | Kikinis ................................. | 709/246 |
| 5,781,550 | * | 7/1998 | Templin et al. ..................... | 370/401 |
| 5,828,844 | * | 10/1998 | Civanlar et al. ..................... | 709/228 |
| 5,835,718 | * | 11/1998 | Blewett ................................ | 709/218 |
| 5,852,717 | * | 12/1998 | Bhide et al. ........................ | 709/203 |
| 5,864,852 | * | 1/1999 | Luotonen ............................. | 707/10 |
| 5,907,680 | * | 5/1999 | Nielsen ................................ | 709/533 |
| 5,987,517 | * | 11/1999 | Firth et al. ........................... | 709/230 |
| 6,025,931 | * | 2/2000 | Bloomfield ......................... | 358/402 |
| 6,085,234 | * | 7/2000 | Pitt et al. ............................. | 709/217 |

OTHER PUBLICATIONS

RFC 1738, "Univorm Resource Locators (URL)", Berners–Lee, Masinter & McCahill, pp 1–25.
"C/C++SoftBench User's Guide", Hewlett Packard Company, pp. 2–22.
RFC 959, "File Transfer Protocol", J. Postel et al., Network Working Group, Oct. 1985, pp 1–65.
RFC 1945, "Hypertext Transfer Protocol", T. Berners et al., Network Working Group, May 1996, pp 1–56.

* cited by examiner

Primary Examiner—Mark H. Rinehart
Assistant Examiner—Paul Kang
(74) Attorney, Agent, or Firm—Fitzpatrick, Cella, Harper & Scinto

(57) ABSTRACT

A proxy server is present in the path between the client and server, and intervenes in communication therebetween. Upon receiving a request from the client according to the HTTP protocol, the proxy server specifies a server based on the request, and determines the communication protocol to be used in the communication with the specified server. If the CM protocol is determined, the proxy server generates request data suitable for the CM protocol by adding necessary information, so as to implement the request contents included in the request, and communicates with the server. The proxy server sends back the processing result based on the request to the client according to the HTTP protocol.

39 Claims, 13 Drawing Sheets

FIG. 6

```
List of / abc / def
< UL >
< LI > < A HREF=" //CM : 80 / abc / def / xxx. html" >xxx. html </ A >
    [ < A HREF=" //CM : 80 / abc / def / xxx. html?ci" > CheckIn </ A > ]
    [ < A HREF=" //CM : 80 / abc / def / xxx. html?co" > CheckOut </ A > ]
< LI > < A HREF=" //CM : 80 / abc / def / yyy. html" > yyy. html </ A >
    [ < A HREF=" //CM : 80 / abc / def / yyy. html?ci" > CheckIn </ A > ]
    [ < A HREF=" //CM : 80 / abc / def / yyy. html?co" > CheckOut </ A > ]
< LI > < A HREF=" //CM : 80 / abc / def / zzz. html" > zzz. html </ A >
    [ < A HREF=" //CM : 80 / abc / def / zzz. html?ci" > CheckIn </ A > ]
    [ < A HREF=" //CM : 80 / abc / def / zzz. html?co" > CheckOut </ A > ]
</ UL >
< HR >
< A HREF=" //CM : 80 / abc" > to Parent Directory </ A >
```

FIG. 7

List of / abc / def
- xxx. html [ CheckIn ] [ CheckOut ]
- yyy. html [ CheckIn ] [ CheckOut ]
- zzz. html [ CheckIn ] [ CheckOut ]

to Parent Directory

FIG. 9

NEW CHECK-IN
 / / WWW : 80 / abc / def / xxx. html

FILE EXPLANATION

☐ ALLOW TO CREATE DIRECTORY

[EXECUTION]  [CANCEL]

FIG. 10

UPDATE CHECK-IN
 / / WWW : 80 / abc / def / xxx. html

CHANGE CONTENTS

[EXECUTION]  [CANCEL]

FIG. 12

CHECK OUT FILE
 / / WWW : 80 / abc / def / xxx. html

LOCAL FILE NAME

☐ CHECK OUT FOR MODIFICATION

EXECUTION    CANCEL

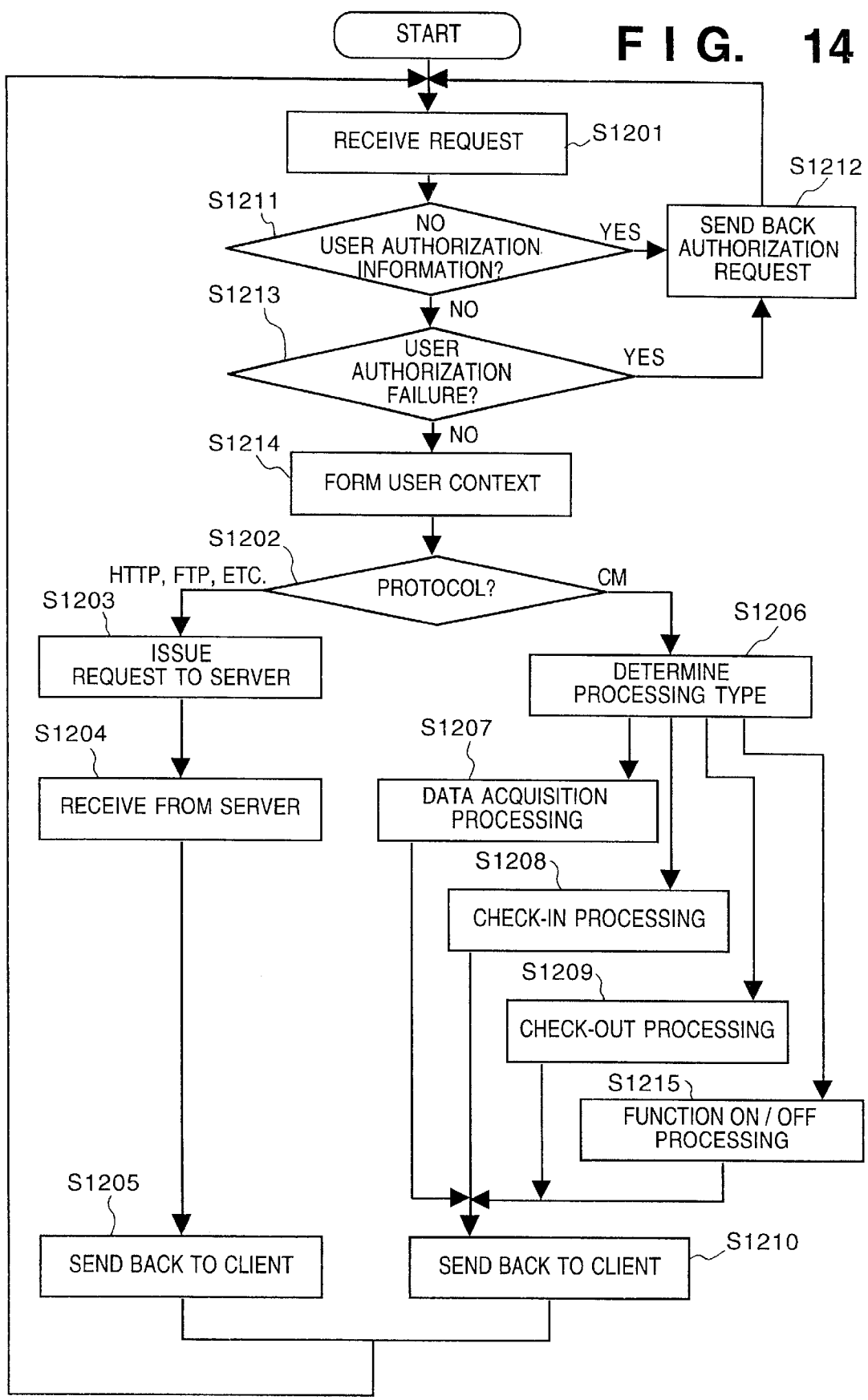

FIG. 15

| USER NAME | CONTEXT DATA ITEM | CONTEXT DATA | |
|---|---|---|---|
| | | CONTEXT DATA CONTENTS | DEBUGGING DURING EVALUATION |
| USER 1 | CHECK-IN CHANGE CONTENTS | | OFF |
| | DIRECTORY CREATION GRANT FLAG | | ON |
| | MODIFICATION-PURPOSE CHECK-OUT FLAG | | ON |
| | SEND BACK LOCAL FILE | | ON |
| | INSERT EXPLANATORY MESSAGE | | |
| USER 3 | CHECK-IN CHANGE CONTENTS | | OFF |
| | DIRECTORY CREATION GRANT FLAG | | OFF |
| | MODIFICATION-PURPOSE CHECK-OUT FLAG | | ON |
| | SEND BACK LOCAL FILE | | ON |
| | INSERT EXPLANATORY MESSAGE | | |
| ...... | ...... | | ...... |

FIG. 16

```
/ xyz / *            / disk1 / xyz / *
/ xyz2 / *           / disk2 / xyz / *
/ *                  / home / nakai / doc / *
```

INFORMATION PROCESSING APPARATUS AND METHOD

BACKGROUND OF THE INVENTION

The present invention relates to an information processing apparatus, which intervenes in the data path between clients and servers in a system that operates in a client/server mode on a computer network, and mediates requests from clients to servers, and its method.

In general, as a proxy server that intervenes in the data path between clients and servers, "delegated" programmed by Yutaka Sato is known. Everyone can get the program "delegated" from an anonymous FTP site at a URL:

ftp://etlport.etl.go.jp/pub/DeleGate/

(URL is the abbreviation for Uniformity Resource Locators, and is described in detail in RFC-1738. "RFC-xxxx" indicates the protocol specifications published on Internet Architecture Board.)

With the advent of a system on a network, which has been popularly used in recent years, i.e., the World Wide Web system (note that the Web browser is a client program for the World Wide Web system, and the Web server is a server program for that system), such proxy server conveniently serves as an effective means for relaying communications between a Web browser and Web server.

The principal objectives of such existing proxy server are to limit direct firewall accesses from end user's computers and to promote security management. For these purposes, the principal function of the proxy server is to simply relay a request from a given client to a final server, and the proxy server itself does not normally change the contents of data.

However, some proxy servers not only relay data communications between clients and servers but also execute some kinds of data conversion.

Such conversion includes, e.g., kanji code conversion. Several types of kanji codes are currently used in various computers, and the same type of kanji codes is not always used in all resources (files) distributed onto a plurality servers. A given proxy server recognizes the type of kanji codes in a file acquired from a mediated server, and converts the recognized kanji code into one convenient for a client upon sending back the file to the client.

A proxy server that implements protocol conversion is also known. The above-mentioned "delegated" communicates with clients according to an HTTP protocol (Hypertext Transfer Protocol: described in detail in Internet Draft of the Internet Engineering Task Force). In this case, the proxy server determines the protocol that the server of interest uses on the basis of data in a URL contained in a request from a client, and makes an access that satisfies the request from the client using the determined server protocol. For example, "delegated" implements protocol conversion from the HTTP protocol to an FTP protocol (File Transfer Protocol: described in detail in RFC-959).

Since the proxy server connected to a client performs protocol conversion to communicate with a server, the client side can perform systematic processing independently of the actual server's protocol, and the user can feel systematic use. This is the advantage of use of the proxy server.

However, in the above-mentioned data conversion and protocol conversion, the data format conversion is merely done in communications between clients and servers, and no new information is added. That is, the proxy server merely relays information between clients and servers.

For this reason, requests from clients often have insufficient information for a protocol supported by a certain server so as to issue a request to that server, and the data conversion and protocol conversion may be disabled. As a result, the client side cannot systematically access the server with such protocol.

The conventional proxy server has no dedicated logic for determining the server to be connected so as to satisfy a request from a client. That is, the proxy server accesses only the server described in the request from the client.

For this reason, no problem is posed when information that satisfies a request from a client is present in only that server. However, when the information corresponding to the request is distributed to a plurality of locations or is present at one of a plurality of locations, the user himself or herself who is operating the client must access these locations to acquire the information he or she desired.

SUMMARY OF THE INVENTION

The present invention has been made in consideration of the above-mentioned problems, and has as its object to provide an information processing apparatus having a proxy server function that can implement protocol conversion by adding appropriate information even when a request from a client does not include any information required for the protocol conversion, and its method.

It is another object of the present invention to automatically determine which server (or system) has information that satisfies a request from a client without any user's operation.

In order to achieve the above object, according to an aspect of the present invention, there is provided an information processing apparatus having a proxy server function in a client/server system, comprising specifying means for receiving a first request that designates a first communication protocol from a client, and specifying a server on the basis of the first request, determination means for determining a second communication protocol to be used in a communication with the server specified by the specifying means, generation means for generating a second request suitable for the second communication protocol to implement request contents included in the first request, and communication means for communicating with the server specified by the specifying means using the second request generated by the generation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of file list data formed by the proxy server in the first embodiment;

FIG. 7 shows a text file (FIG. 6) displayed on a Web browser;

FIG. 9 shows a display example of a new check-in window;

FIG. 10 shows a display example of an update check-in window;

FIG. 12 shows a display example of a check-out window;

FIG. 14 is a flow chart for explaining the control sequence of the proxy server according to the second embodiment of the present invention;

FIG. 15 shows an example of the data format of a user context holding unit; and

FIG. 16 shows an example of a file that describes how to determine the file name according to the first embodiment.

DETAILED DESCRIPTION OF THE PREFERRED EMBODIMENTS

Preferred embodiments of the present invention will now be described in detail in accordance with the accompanying drawings.

<Outline of Embodiment>

Figure 1:
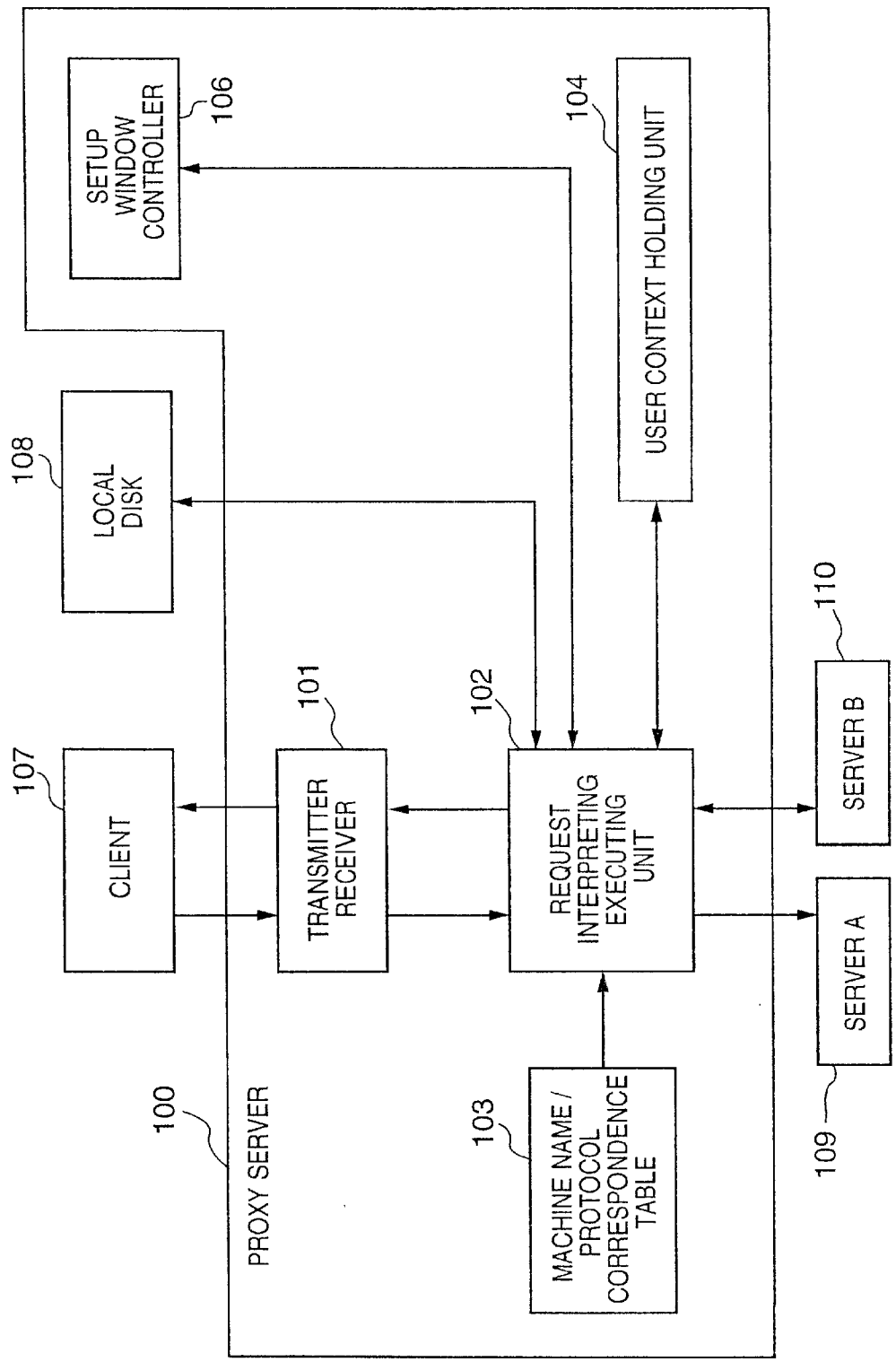
FIG. 1 is a block diagram showing the functional arrangement of a proxy server according to an embodiment of the present invention.

FIG. 1 is a block diagram showing the functional arrangement of a proxy server according to this embodiment. As shown in FIG. 1, a proxy server 100 of this embodiment comprises a transmitter/receiver 101 for directly exchanging data with clients, and a request interpreting/executing unit 102 for exchanging data with servers to satisfy a request from the client. A user context holding unit 104 stores information input by the user to this proxy server 100. A setup window controller 106 controls display of a setup window for requesting the user to input information necessary for protocol conversion, input from the window, and the like. The user context holding unit, the setup window controller 106, a local disk 108 (to be described later), and the like are used as means for acquiring information necessary for protocol conversion.

In FIG. 1, a client 107 is a client program which issues a request to the proxy server 100, and the local disk 108 is an external storage device such as a hard disk or the like on a computer on which the client program is running or being displayed. Servers A 109 and B 110 are individual servers requests to which the proxy server mediates.

The operation of the proxy server in FIG. 1 will be briefly described below. When the transmitter/receiver 101 has received a request from the client 107, the request is passed to the request interpreting/executing unit 102. The request interpreting/executing unit 102 checks a protocol that the server as the destination of the request supports, and executes protocol conversion if necessary.

In this case, information contained in the request from the client alone is often insufficient to execute conversion to the protocol that the destination server supports. In such case, information or the like on the user context holding unit 104 or local disk 108 is read out, or the setup window controller 106 presents the setup window on a display of the client 107 to request the user to input necessary information, thus acquiring the information required for protocol conversion.

The request interpreting/executing unit 102 inquires the server as to whether it has capability (resources) of satisfying the request or its resource state before it directly issues the request from the client to that server, and determines a server or system that can satisfy the request from the client most satisfactorily.

In this way, the request interpreting/executing unit 102 issues a request after it specifies the necessary information and actual request destination, and then receives information sent back therefrom. Also, the request interpreting/executing unit 102 adds another information to the information sent back from the request destination, and sends them to the transmitter/receiver 101, which then sends back the data to the client 107.

In these processes, the request interpreting/executing unit 102 records the information required for the subsequent processing in the user context holding unit 104.

<First Embodiment>

In the first embodiment, a case will be explained below wherein the proxy server 100 in FIG. 1 intervenes between the client 107 and the two different servers 109 and 110 to access the two servers from the client 107 side. Note that the user context holding unit 104 described in FIG. 1 is used in the second embodiment, and may be omitted since it is not used in the first embodiment.

As the client 107, a commercially available Web browser (e.g., Netscape Navigator (tradename) available from Netscape Communications Corporation, or the like) is used. As the server A 109, a popularly used Web server (e.g., httpd server (tradename) available from CERN) is used. Furthermore, as the server B 110, a SoftBench CM (tradename) server available from Hewlett Packard Company as a server of a file configuration management system is used.

The SoftBench CM is a file saving revision system which operates in a client/server mode, and command programs on the client side are prepared:

to check in a file from a client machine (save a file onto the server or register changes in file contents);

to check out a file from a server machine (to retrieve a file saved on the server to the client machine);

to acquire a file list on the server machine (to obtain information indicating files saved on the server machine or indicating files which have been checked out for modification). These functions are described in detail in "C/C++ SoftBench User's Guide", Hewlett Packard Company, pp. 2–22.

Figure 2:
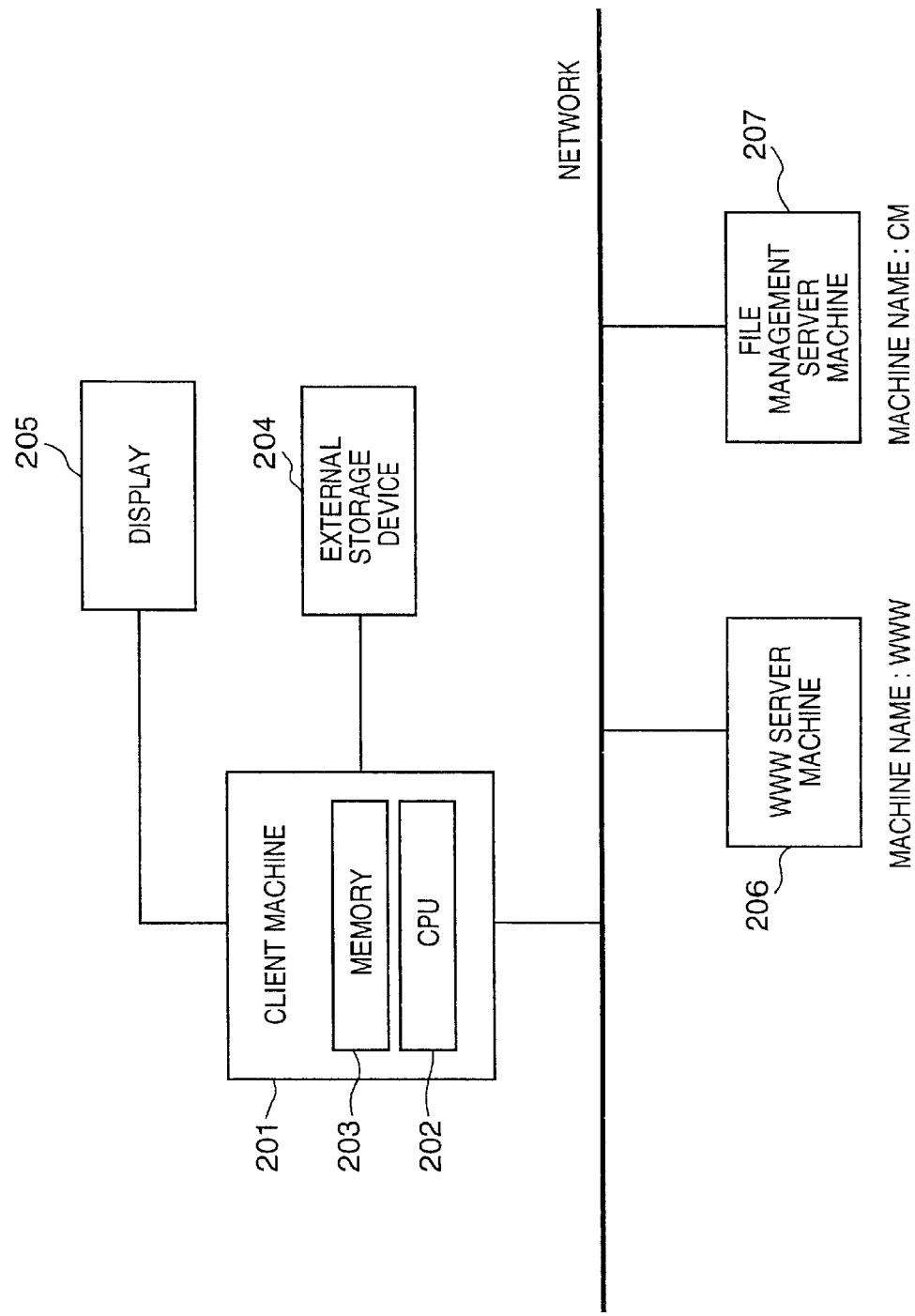
FIG. 2 is a block diagram showing the overall arrangement of an information processing system according to the first embodiment of the present invention.

FIG. 2 shows the overall arrangement of an information processing system according to the first embodiment. A client machine 201, WWW server machine 206, and file management server machine 207 are connected on a network, and can communicate with each other via IP (Internet Protocol).

The programs of the above-mentioned client 107 and proxy server 100 are stored in an external storage device 204 of the client machine 201, are loaded onto a memory 203, and are executed by a CPU 202. Note that the local disk 108 in FIG. 1 corresponds to the external storage device 204 in FIG. 2. The display window or the like of the client 107 is displayed on a display 205, and the setup window controller 106 of the proxy server also displays the setup window on the display 205.

In this embodiment, the client 107 and proxy server 100 run on an identical machine (client machine 201), but may run on different machines.

As will be described later, the proxy server 100 itself often accesses the display 205 or external storage device 204 of the client machine 201. In such case, the server 100 can directly access the display 205 or external storage device 204 by communicating with a server equivalent to a network such as an X Window System server, NFS (Network File System) server, FTP (File Transfer Protocol) server, and so forth (a server which can be used in the same way regardless of its location, i.e., a remote location on the network or in the own machine), and the contents described in this embodiment can be implemented by such server.

The servers A 109 and B 110 in FIG. 1 are respectively running on the WWW server machine 206 and file management server machine 207 which are computers on the network. The machine names (those which can be converted into IP addresses; i.e., host names) of these two computers are defined to be "WWW" and "CM", respectively. These computers need not always be different ones, but may be an identical machine.

In the following description, the Web server running on the server A 109 will be simply referred to as a Web server, the SoftBench CM server running on the server B 110 will be simply referred to as a CM server, and the Web browser running on the client machine 201 will be simply referred to as a Web browser.

Assume that the Web server, CM server, and Web browser are running on the corresponding machines, and the proxy server 100 has been started by the user who started the Web browser. Note that the Web server can be set so that a request issued by itself is sent not directly to the final server but via the proxy server. Hence, the Web browser of this embodiment is set to issue a request via the proxy server 100.

Figure 3:
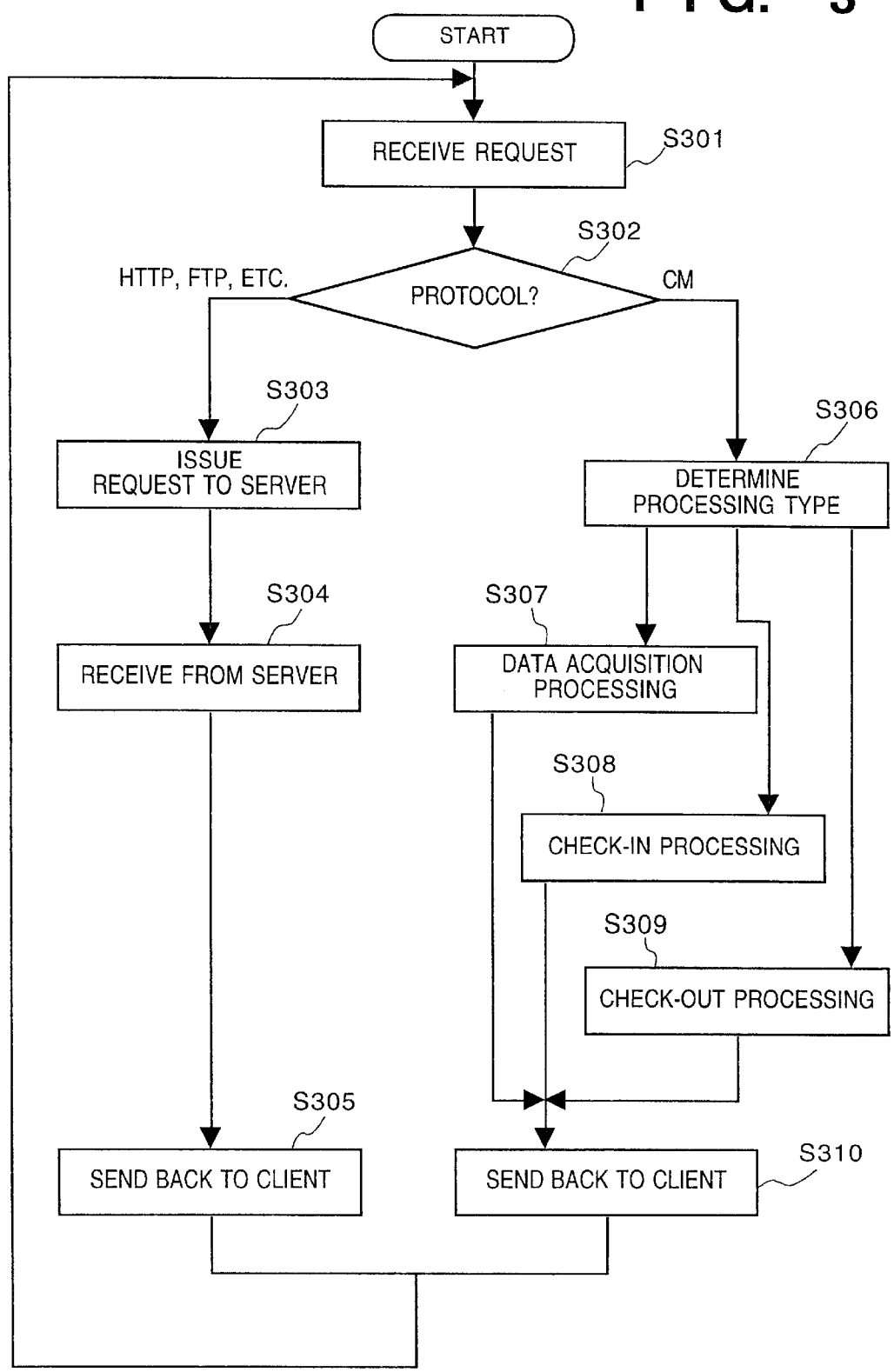
FIG. 3 is a flow chart for explaining the control sequence of the proxy server according to the first embodiment.

The processing of the proxy server 100 executed when the user operates the Web browser in this state to issue a request to the proxy server 100 will be explained below. FIG. 3 is a flow chart for explaining the control sequence of the proxy server according to the first embodiment.

The proxy server 100 receives a request from the client 107 by the transmitter/receiver 101 in step S301. The request interpreting/executing unit 102 forms data to be sent back to the Web browser on the basis of the received request (the respective processing operations in steps S302 to S304 and S306 to S309), and the transmitter/receiver 101 sends back the formed data to the Web browser (the processing in steps S305 and S310).

The processing in step S302 and subsequent steps will be described in detail below.

The received data from the Web browser has the following syntax according to the HTTP protocol:

[method name] [protocol name]://[server machine name] :[server port number]/[resource name] [protocol version]
[additional information] . . .

For example, if the request received in step S301 is:
GET http://WWW:80/abc/def/xxx.html HTTP/1.0 . . .
then, it is interpreted as:

| method name | GET |
| protocol name | http |
| server machine name | WWW |
| server port number | 80 |
| resource name | /abc/def/xxx.html |
| protocol version | HTTP/1.0 |

The proxy server of this embodiment has a machine name protocol correspondence table 103. This table shows the correspondence among the server machine names (or IP addresses), server port numbers, and protocols that the servers actually support.

Figure 4:
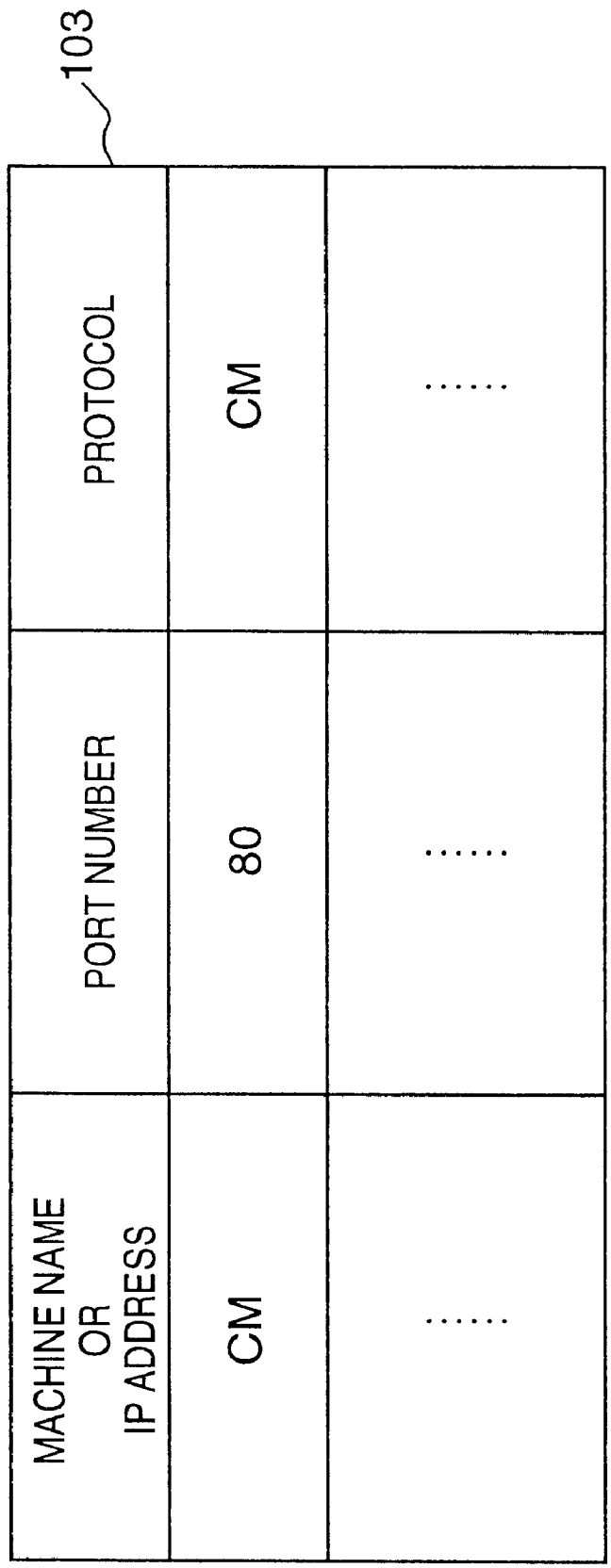
FIG. 4 shows an example of a machine name protocol correspondence table according to the first embodiment.

FIG. 4 shows an example of the machine name protocol correspondence table according to the first embodiment. The following explanation will be given assuming that the proxy server has the table shown in FIG. 4.

In step S302, the proxy server determines a protocol that the server actually supports on the basis of the server machine name and server port number in the request, and the machine name-protocol correspondence table 103.

In this example,

| server machine name | WWW |
| server port number | 80 |

However, such combination is not described in the table shown in FIG. 4. For this reason, the protocol cannot be determined from this table. That is, since the protocol described in the request from the client cannot be determined by the correspondence table, the protocol used in communications with the server as the destination of the request is determined based on the protocol name "http" described in the request from the client. Hence, in this case, the protocol is determined to be the HTTP protocol.

The correspondence between the protocol name in the request and actual protocol is described in RFC-1738 (Uniformity Resource Locator), and is generally known information. Based on this information, it is determined that "http" corresponds to the HTTP protocol.

When the HTTP protocol is determined, the flow advances to the processing in step S303. Since the HTTP protocol is the same as that sent from the Web browser, the proxy server of this embodiment merely relays the request from the client to the server, and relays data from the server to the client without any special processing. That is, the proxy server directly sends the request from the client to the server in step S303, receives data sent back from the server in step S304, and sends the received data to the Web browser in step S305. Such processing is the same as that executed by existing normal proxy servers.

On the other hand, if the request received in step S301 is:
GET ftp://WWW:21/abc/def/xxx.html HTTP/1.0 . . .
it is determined in step S302 that the protocol is the FTP (File Transfer Protocol), and the proxy server of this embodiment must perform protocol conversion between the HTTP and FTP protocols. However, this processing is also the same as that executed by normal proxy servers, and its description will be omitted from that of this embodiment.

The processing when the request received in step S301 has the following contents will be explained below:
GET http://CM:80/abc/def HTTP/1.0 . . .
As described above, this request is interpreted as:

| method name | GET |
| protocol name | http |
| server machine name | CM |
| server port number | 80 |
| resource name | /abc/def |
| protocol version | HTTP/1.0 |

It is determined in step S302 based on the machine name protocol correspondence table shown in FIG. 4 that the protocol supported by the server having:

| | |
|---|---|
| server machine name | CM |
| server port number | 80 | is the CM protocol.

The protocol name "CM protocol" is not a common name but indicates a protocol used in client/server communications of SoftBench CM (tradename) available from Hewlett Packard Company. Since this protocol does not have a common name, it will be called the CM protocol for the sake of simplicity.

If the CM protocol is determined in step S302, the flow advances to steps S306 to S310 to start processing for performing conversion between the HTTP and CM protocols and adding information. This processing is the characteristic feature of this embodiment.

In step S306, the type of processing to be executed by the CM server is determined based on "resource name" in the request. In order to determine such type of processing, the syntax of the resource name in the request to the CM server is defined in advance as:

operation target name?processing name and the portion after letter "?" is used for determining the type of processing. In this embodiment, the resource name is "/abc/def", and the processing name is not specified. In such case, "data acquisition processing" is determined, and the flow advances to step S307.

Figure 5:
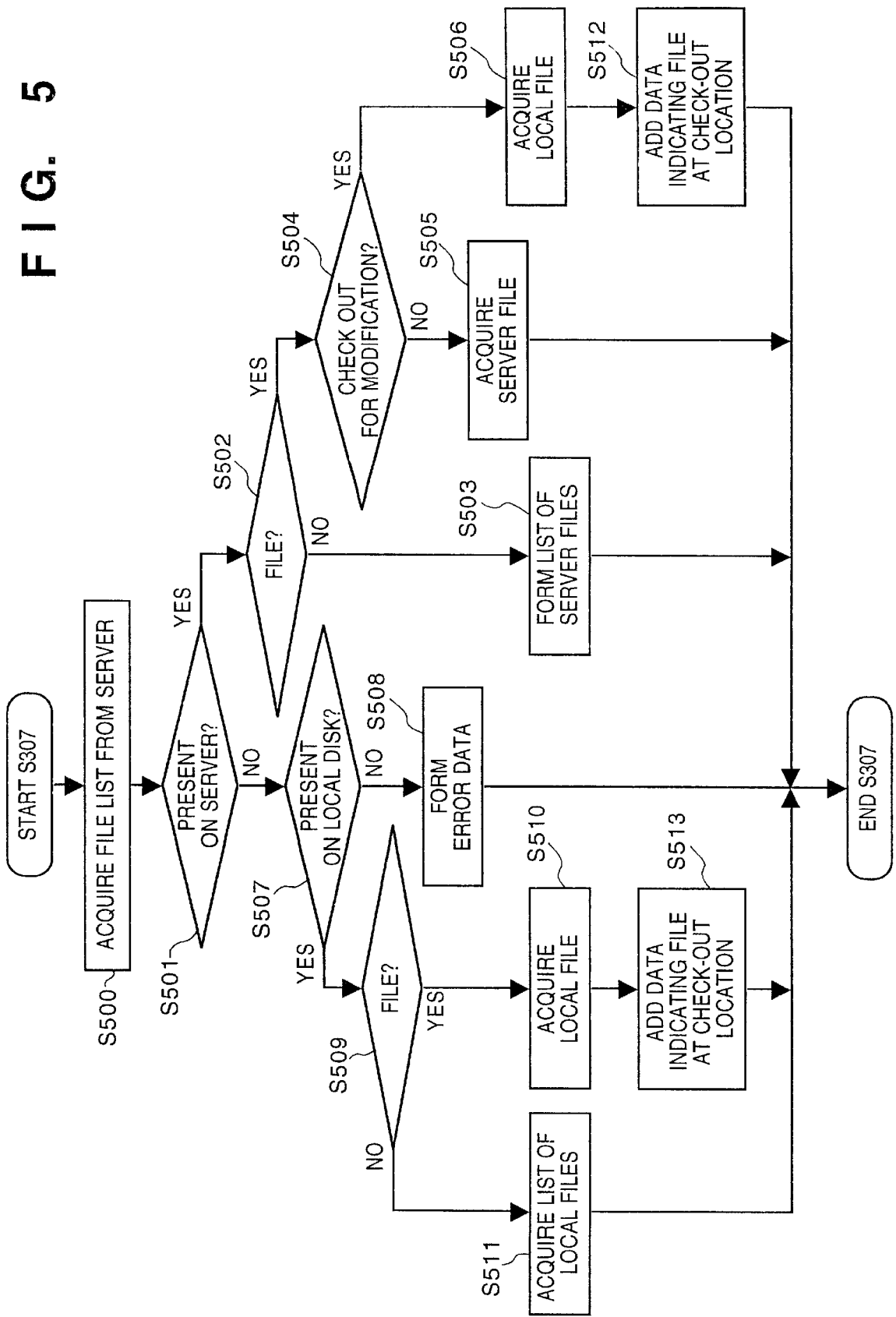
FIG. 5 is a flow chart for explaining the detailed control sequence of data acquisition processing (step S307)

FIG. 5 is a flow chart for explaining the detailed control sequence of the data acquisition processing (step S307). The data acquisition processing in step S307 will be described below with reference to FIG. 5.

In step S500, the proxy server 100 checks using a file list get command if a file or directory named "/abc/def" is present in the CM server. According to the reply value of this command, it is determined that the above name indicates one of:

a) a directory on the server;
b) a file on the server, which is not checked out for modification;
c) a file on the server, which is checked out for modification; and
d) not present on the server.

Subsequently, the flow advances to one of the following steps according to the determination result in the branch processing of steps S501, S502, and S504:

step S503 (if the determination result is "a)")
step S505 (if the determination result is "b)")
step S506 (if the determination result is "c)")
step S507 (if the determination result is "d)")

The processing in step S503 will be explained below assuming that "/abc/def" is a directory name on the server.

In step S503, a list of file directory names present under the directory "/abc/def" on the CM server is acquired using a file list get command. Postulate that this command indicates there are three following files under the directory:

xxx.html yyy.html zzz.html

Then, the proxy server forms a text file described in the HTML language, as shown in FIG. 6. FIG. 6 shows an example of file list data formed by the proxy server in the first embodiment. The HTML language is the abbreviation for Hypertext Markup Language, is popularly used for displaying messages on the Web browser and the like, and is described in detail in references such as RFC-1866.

After that, the flow returns to the processing in step S310 in FIG. 3, and the contents of the text file shown in FIG. 6 are sent back to the Web browser by the transmitter/receiver 101. Upon reception of the text file, the contents shown in FIG. 7 are displayed on the message display window of the Web browser. FIG. 7 shows the state wherein the Web browser displays the text file shown in FIG. 6.

In FIG. 7, each underlined portion indicates that a hyperlink is embedded, and when this portion is designated on the Web browser window, a new request is sent to the proxy server 100. This will be explained later. In this way, upon completion of step S310, the flow returns to step S301 again to wait for the next request from the client.

In step S503, the file list command used for the CM server uses a specific protocol (CM protocol in this specification) to make data communications with the CM server. Hence, the processing in steps S306 to S310 corresponds to protocol conversion between the HTTP and CM protocols.

The processing executed when the user wants to read the contents of xxx.html on the Web browser that is displaying the contents shown in FIG. 7 will be explained below. In such case, the user designates the portion "xxx.html" on the window using a pointer device such as a mouse or the like.

Upon designation of the hyperlinked portion, the Web browser normally issues a new request to the server. In this example, the portion displaying xxx.html is linked to the server name, port number, and resource name defined by //CM:80/abc/def/xxx.html by the description <A HRF="//CM:80/abc/def/xxx.html"> in the HTML language shown in FIG. 6. That is, the request issued by the Web browser in response to the above operation is:

GET http://CM:80/abc/def/xxx.html HTTP/1.0

This request is received in step S301.

The subsequent processing until step S501 via steps S302 and S306 is the same as that in the above example. In step S501, information is checked to determine if the resource name /abc/def/xxx.html is present on the CM server, and so on. In this example, assume that /abc/def/xxx.html is "a file on the server, which is not checked out for modification".

The flow then advances to step S505. In step S505, the file "/abc/def/xxx.html" on the CM server is acquired from the CM server using a check-out command. When the acquired file is sent back to the Web browser instep S310, the contents of "/abc/def/xxx.html" are displayed on the Web browser, thus satisfying the user's request.

The processing executed when the above-mentioned "/abc/def/xxx.html" is "a file on the server, which is checked out by the user for modification" will be explained below. In this case, the flow advances to step S506.

As described above, when the file "/abc/def/xxx.html" is checked out by the user for modification, the proxy server of this embodiment sends back the file at the check-out location, which may have been modified, to the Web browser.

The check-out location of such file is set so that it is uniquely determined by its file name such as "/abc/def/xxx.html" or the like. For example, a rule indicating that the check-out location of a file must be "server machine name/resource name" under the home directory of the user may be provided in advance. Under such rule, the check-out location of "/abc/def/xxx.html" is uniquely determined as "CM/abc/def/xxx.html" under the home directory of the user (CM is the server machine name, and abc/def/xxx.html is the resource name).

The method of making the checked-out resource name correspond to the file name on the local disk may be fixed as in the above example, or a file that describes such method may be stored in an external device to link to that file. For example, a table shown in FIG. 16 may be stored as a file with a specific file name under the user home directory, and the file name may be determined based on this table as follows. The resource name is compared with items in the left column in FIG. 16 in turn from the uppermost row to find a first matching row. Note that * indicates a wildcard letter that can mean any character strings. The file name on the local disk is generated by replacing the * portion of the matching row in the right column by the character string replacing the * in the left column. For example, if the resource name is "/xyz2/pqr/sss.html", it conforms to the second row in the table, and the character string that replaces the * is "pqr/sss.html". Hence, the file name on the corresponding local disk can be determined to be "disk2/xyz/pqr/sss.html".

In this manner, the file name at the check-out location is acquired to allow the proxy server 100 to read the contents of that file. That is, if the proxy server 100 can directly access the local disk 108, it directly reads the file. Alternatively, if an access can be made via a server such as an FTP server that allows an access to files on other machines, a copy of the file is copied to the machine on which the proxy server 100 is running via the server.

Subsequently, in step S512, in order to inform the user of the client that the file is not the one in the server designated by the client but the one at the check-out location, a message:

"this file is the one you checked out before"

is inserted at the beginning or end of the file. Whether or not this message is inserted and the position of the message data when it is inserted depend on the data format of the file of interest.

For example, if the file of interest is a simple text file, the message data is directly inserted at the beginning (or end) of that file. On the other hand, if it is determined that the file of interest is written in the HTML language, the message data is inserted at the beginning (or end) of the contents displayed on the Web browser while interpreting HTML tags. That is, the message data is inserted immediately after (or before) the HTML tag </BODY>. When the file of interest is neither of them, the message data is not inserted.

In step S310, the contents of the file in which the message data has been inserted (or not inserted) are sent back to the Web browser, thus displaying the contents of the file that the user has checked out on the Web browser.

Since access to the local disk 108 in this case is done by issuing a request to a file system running on a computer and receiving sent-back data, it is a kind of protocol conversion or a change of the request destination.

The processing executed when a resource which is not present on the CM server is requested will be explained below. Assume that the request received in step S301 is:

GET http//CM:80/abc/def/www.html HTTP/1.0 . . .

Assume that the flow reaches step S501 according to the above-mentioned processing, and it is determined in step S501 that /abc/def/www.html is not present on the CM server.

In such case, even when such request is sent to the CM server, the request inevitably fails due to the absence of the corresponding resource. So, if the corresponding file is present in the local disk in this case, that file is sent back to the client.

If this is the case, the flow advances from step S501 to step S507 to check if a file or directory corresponding to the resource name is present in the local disk. The method of finding the file name is the same as that described in the paragraph of step S506.

If it is determined in step S507 that no corresponding file is present, the flow advances to step S508 to form error data including a message indicating the absence of "/abc/def/www.html", and the data is sent back in step S310.

On the other hand, if it is determined in step S507 that the corresponding file or directory is present, it is also checked in step S509 if the found one is a file or directory. If it is determined that the found one is a file, the flow advances to step S510. The corresponding file in the local disk is acquired in step S510, and is sent back in step S310.

In this process, message data "this file is a local file" is inserted at the beginning or end of the file to be sent back in step S513. The insertion method is the same as that in step S512.

If it is determined in step S509 that the found one is a directory, the flow advances to step S511. A file list under this directory in the local disk is formed in step S511, and is sent back in step S310. Note that the list of local files formed at that time has the same contents as those in FIG. 6.

The access to the local file system in steps S510 and S511 is a kind of protocol conversion or a change of the request destination, i.e., another request to the file system, as has been described in step S506.

The processing executed when the user designates a portion [CheckIn] after xxx.html on the Web browser which is displaying the contents shown in FIG. 7 will be explained below.

As described earlier, in response to this operation, the Web browser sends the following request to the proxy server of this embodiment:

GET http://CM:80/abc/def/xxx.html?ci HTTP/1.0 . . .

In response to this request, the proxy server 100 executes the same processing as described above in steps S301, S302, and S306 in FIG. 3.

In step S306, the proxy server extracts the processing name from the resource name in the request. In this case, the resource name includes letter "?", and the processing is designated by "ci" following "?". Note that "ci" indicates check-in processing and, hence, the flow advances to step S308.

Figure 8:
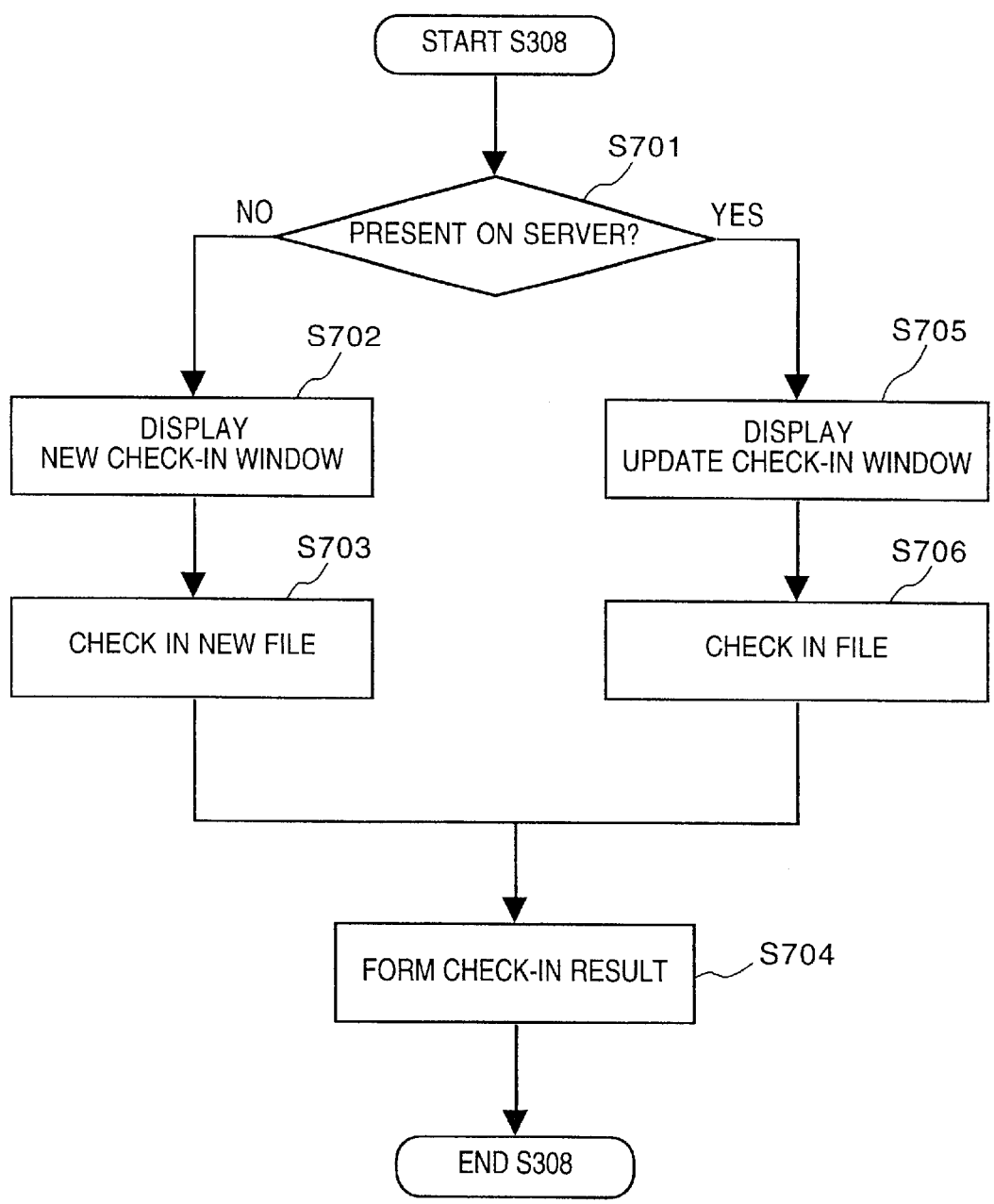
FIG. 8 is a flow chart showing the detailed control sequence of check-in processing (step S308)

FIG. 8 is a flow chart showing the detailed control sequence of the check-in processing (step S308). This processing will be explained below with reference to the flow chart in FIG. 8.

In step S701, it is checked if the designated resource name "/abc/def/xxx.html (in the subsequent processing, a portion excluding the processing name portion (?+character string) included in the resource name in the request is used as the resource name)" is present on the CM server. The checking method is the same as that in the processing in step S500. If it is determined in step S701 that no file with that resource name is present on the CM server, the flow advances to step S702 to check in a new file in the CM server.

In order to check in a new file in the CM server, the following information and the like are required:

the resource name the file name in the local disk 108, that is to be checked in a message that explains the contents of the file to be checked in designation indicating whether or not a new directory is created if necessary upon check-in However, the request describes the resource name alone among these information and the like.

Since the file name in the local disk 108 to be checked in can be generated from the resource name by the method described in the paragraph of step S506, "a message that explains the contents of the file to be checked in" and "designation indicating whether or not a new directory is created if necessary upon check-in" are short upon check-in.

In order to request the user to designate such short information, the setup window controller 106 displays a new check-in window (FIG. 9) on the display 205 of the client machine in step S702. The user inputs the required information on the window, and presses the execution button. Then, the flow advances to step S703.

In step S703, the proxy server issues a file check-in command to the CM server in accordance with the contents designated on the new check-in window, and checks in a new file (saves a file on the CM server).

In step S704, the proxy server forms a text file including a message indicating successful or unsuccessful check-in on the basis of the end state of the check-in command issued in step S703. The proxy server sends back this text file in step S310, and displays it on the Web browser.

On the other hand, if it is determined in step S701 that the resource is present on the CM server, the flow advances to the processing in steps S705 and S706.

In step S705, of the following information and the like required for check-in:

the resource name the file name in the local disk (108), that is to be checked in a message that explains the contents of a change in file to be checked in the proxy server requests the user to input information other than "resource name" obtained from the request and "the file name in the local disk (108), that is to be checked in" obtained from the resource name by the method described in the paragraph of step S506. FIG. 10 shows an update check-in window displayed on the display 205 by the setup window controller 106.

In step S706, the proxy server issues a file check-in command to the CM server in accordance with the information input via the update check-in window shown in FIG. 10, and checks in the file (registers the updated file on the CM server). The subsequent processing in steps S704 and S310 is the same as that described above.

The processing executed when the user designates a portion [CheckOut] after xxx.html on the Web browser that is displaying the contents shown in FIG. 7 will be explained below.

In response to this operation, the Web browser sends the following request to the proxy server 100:

GET http://CM:80/abc/def/xxx.html?co HTTP/1.0 . . .

The proxy server 100 executes the same processing as described above in steps S301, S302, and S306.

In step S306, the proxy server extracts the processing name from the resource name in the request. In this case, since the resource name includes letter "?", which is followed by "co", it is determined that the designated processing is check-out processing. Hence, the flow advances to step S309.

Figure 11:
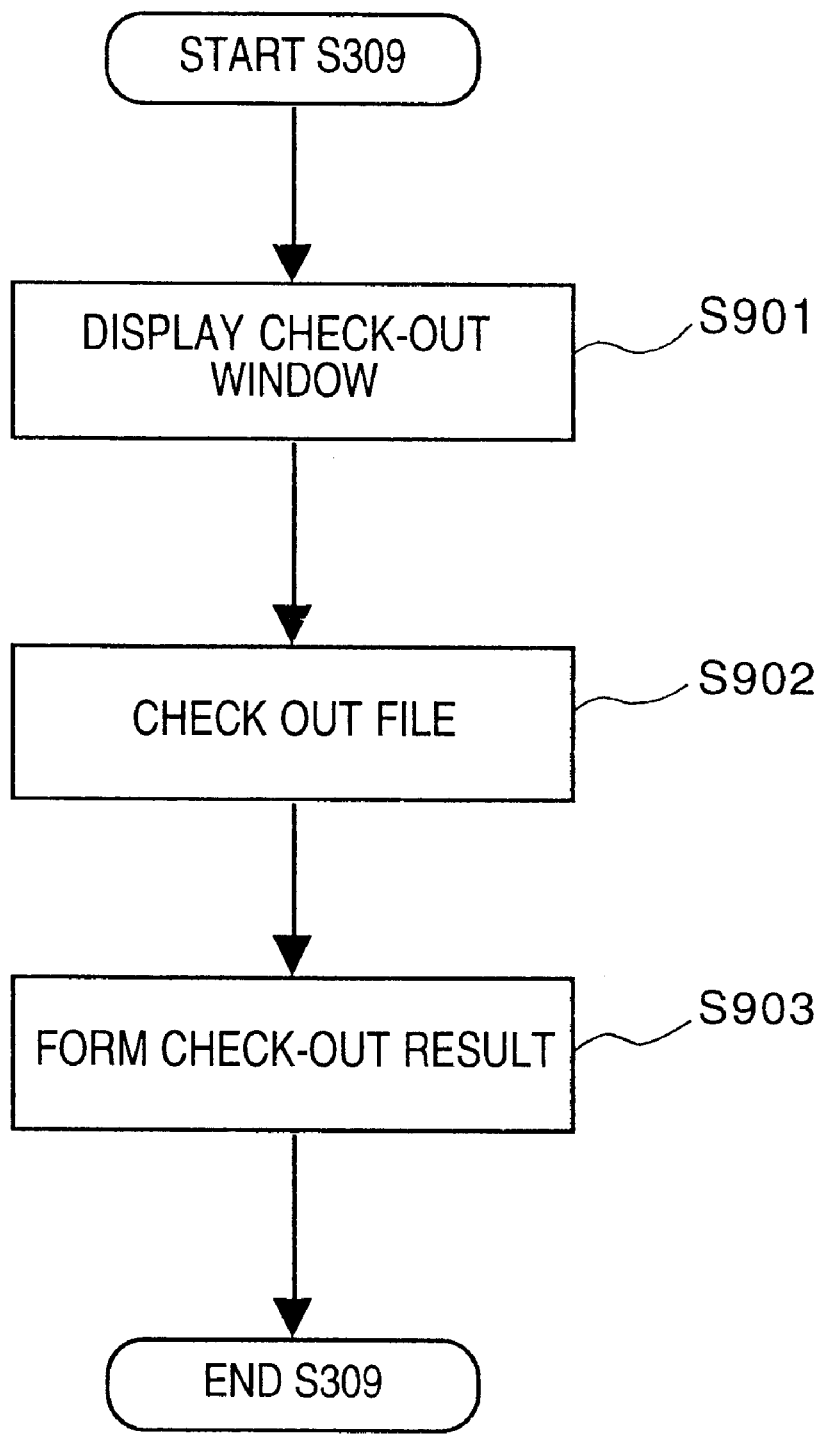
FIG. 11 is a flow chart showing the detailed control sequence of check-out processing (step S309)

FIG. 11 is a flow chart showing the detailed control sequence of the check-out processing (step S309). The check-out processing will be described below with reference to the flow chart in FIG. 11.

In order to check out a file from the CM server, the following information and the like are required:

resource name the file at the check-out location, that is to be checked out information designating if the file is to be checked out for modification However, the request contains only the resource name.

In order to request the user to designate such short information, the setup window controller 106 displays a check-out window shown in FIG. 12 on the display 205 on the client machine in step S901. The user inputs the required information on the window, and presses the execution button. Then, the flow advances to step S902.

In step S902, the proxy server issues a check-out command to the CM server in accordance with the contents designated on the check-out window, and checks out the file (fetches the file on the CM server to the check-out location in the local disk).

When no local file name is designated on the check-out window, the local file name is determined on the basis of the correspondence between the resource name and the file name on the local disk, that has been described in the paragraph of step S506.

In step S903, the proxy server forms a text file including a message indicating successful or unsuccessful check-out on the basis of the end state of the check-out command issued in step S902. The proxy server sends back this text file in step S310, and displays it on the Web browser.

<Second Embodiment>

In the first embodiment, since the proxy server 100 is started by the same user of the same machine as the one who started the client 107, the proxy server 100 can obtain information of the user (client 107) who started the server from its own process (program execution environment in the computer system).

For example, in the description of step S506 in the first embodiment, the method of finding the file name on the local disk from the resource name has been exemplified. The reason why the proxy server can determine the location of the home directory of the user who started the client 107 because the proxy server 100 itself has the information of the user who started the client 107 as process information.

The second embodiment can apply the present invention to a system in which the user who started the client is not the same as the user who started the proxy server 100.

Figure 13:
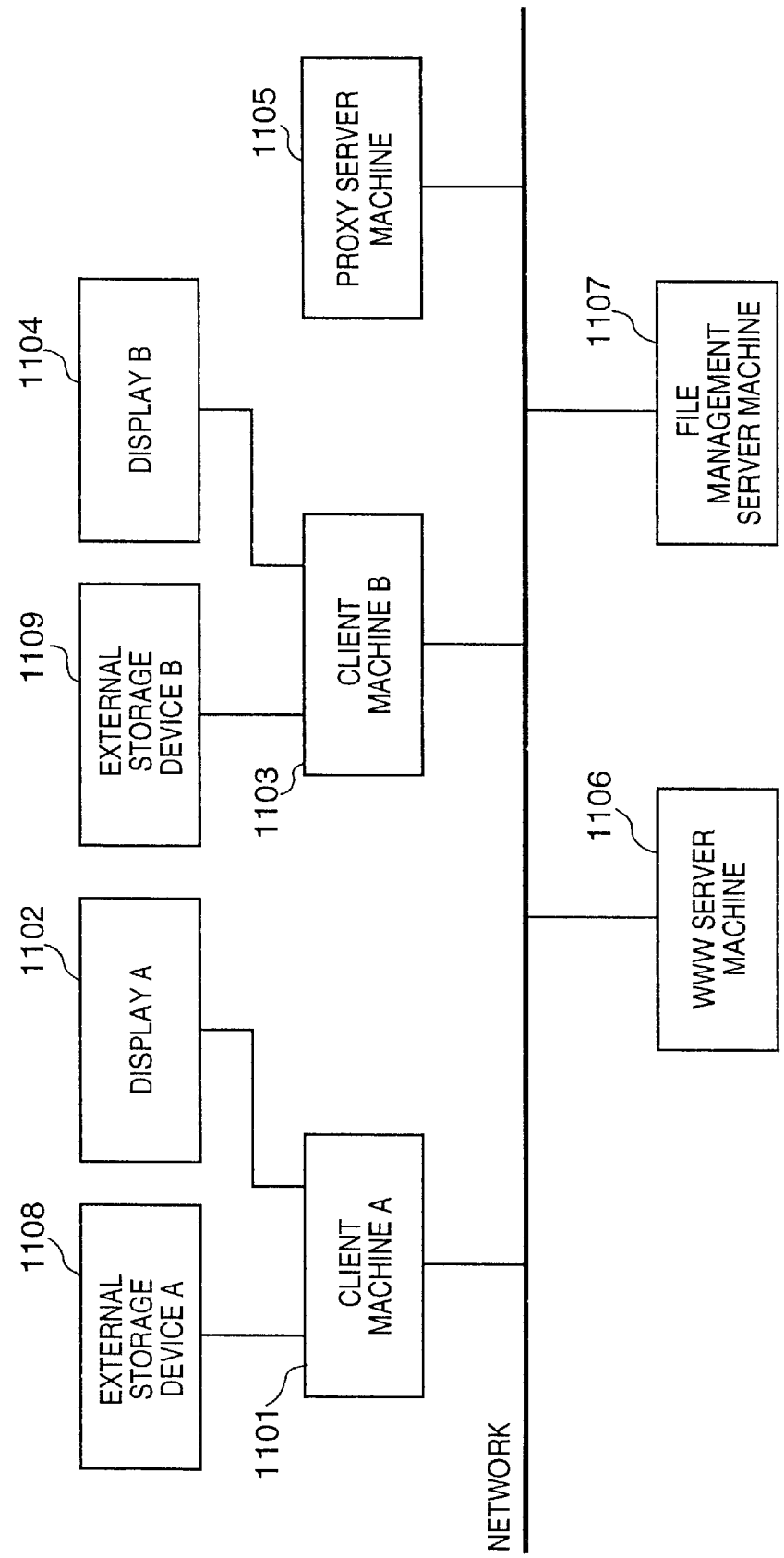
FIG. 13 is a block diagram showing the arrangement of a computer according to the first embodiment.

FIG. 13 shows the computer arrangement of this embodiment. Reference numerals 1101, 1103, 1105, 1106, and 1107 denote computer systems, each of which comprises a CPU and memory (neither are shown). The computer systems 1101 and 1103 respectively comprise external storage devices 1108 and 1109.

Assume that the same programs as the client 107 in FIG. 1 have been started on the client machines A 1101 and B 1103 by "user 1" and "user 2", respectively. The clients 107 on these machines display their display windows on displays 1102 and 1104 of the corresponding machines. Assume that the proxy server 100 has been started by "user P" on the proxy server machine 1105.

Server programs which have been started on the WWW server machine 1106 and file management server machine 1107 are respectively the same as those started on the WWW server machine 206 and file management server machine 207 described in the first embodiment.

FIG. 14 is a flow chart for explaining the control sequence of the proxy server according to the second embodiment. The operation of the second embodiment will be described below with the aid of FIG. 14.

The processing in FIG. 14 is substantially the same as that in FIG. 3, and steps S301 to S310 in FIG. 3 respectively correspond to steps S1201 to S1210 in FIG. 14. The differences are that steps S1211 to S1214 are added between steps S1201 and S1202, and the processing in steps S1207 to S1209 is partially different from that in steps S307 to S309. Note that step S1215 is the processing pertaining to the third embodiment, and may be omitted in this embodiment.

The processing executed when the proxy server on the proxy server machine 1105 has received the following request from the client 107 on the client machine A 1101 will be explained below:

GET http://CM:80/abc/def/www.html HTTP/1.0 additional information . . .

In step S1201, the proxy server receives the request. In step S1211, it is checked if the additional information of that request contains user authorization information. This checking is done based on "Proxy-Authorization" header information defined in the HTTP protocol. If the additional information does not contain this information, the flow advances from step S1211 to step S1212. In step S1212, "error status 407" defined in the HTTP protocol is sent back to the client 107 of the client machine A 1101 in response to the above request. The client who received "error status 407" re-issues the request by appending "Proxy-Authorization" header information to that request (defined in the HTTP protocol).

The client 107 of the client machine A 1101 normally presents a window that prompts the user to input the user name and password required for adding the "Proxy-Authorization" header information, and re-issues the request by appending the "Proxy-Authorization" header information containing the user name and password input at that window.

The following explanation will be given assuming that the user inputs "user 1" as the user name. In step S1201, the request is received again, and the flow advances to step S1211. Since the request contains "Proxy-Authorization" this time, it is determined that user authorization information is present, and the flow advances to step S1213. In step S1213, the proxy server extracts the user name and password from the "Proxy-Authorization" information in the request to authenticate the user (collate the user name and password). If authentication fails (the user name and password do not match), the flow returns to step S1212, and the proxy server requests the client 107 of the client machine A 1101 to resend the request. In this case, the client 107 normally prompts the user to re-input the user name and password, and resends the request by appending the re-input information.

On the other hand, if user authentication is successful, the flow advances to step S1214. In step S1214, the proxy server extracts the user name from the "Proxy-Authentication" information in the request. In this example, the user name is "user 1". The proxy server checks if data with this user name is present in the user context holding unit 104.

The user context holding unit 104 holds information of the previous accesses to this proxy server 100 by the user in the form of a table shown in, e.g., FIG. 15 using the user name as an entry. In this embodiment, the following three data are recorded per user, as shown in FIG. 15:

Check-in change contents: the text representing the change contents set on the check-in window presented in step S705;

Directory creation grant flag: the directory creation grant/denial state set on the check-in window presented in step S705; and Modification-purpose check-out flag: the modification-purpose check-out designation state set on the check-out window presented in step S903.

Note that "send back local file" and "insert explanatory message" shown in FIG. 15 are used in the third embodiment, and may be omitted in this embodiment.

It is checked if the above-mentioned user context holding unit 104 includes data of "user 1". If no such data are included, an entry of that user is created on the user context holding unit 104, and the respective context data of the user are set at initial values. If data of "user 1" are already stored in the user context holding unit 104, the flow advances to step S1202 without any processing in step S1214.

Since the subsequent processing in steps S1202 to S1206 and S1210 are the same as that in steps S302 to S306 and S310 in FIG. 3 described in the first embodiment, a detailed description thereof will be omitted. The processing in steps S1207 to S1209 including differences from the first embodiment will be explained below.

A case will be explained below wherein the flow has reached step S1207 as the data acquisition processing. The processing contents in step S1207 are substantially the same as those described in the first embodiment with reference to FIG. 5, except for the processing in steps S506 and S509 to S511.

In the first embodiment, the proxy server accesses a file or directory on the external storage device 204 connected to the client machine 201 in these steps. However, in this embodiment, the proxy server accesses the machine which issued the request, i.e., the external storage device 1108 of the client machine A 1101. In this case, the user name extracted in user authentication in step S1213 is used upon determining, from the resource name included in the request, the file or directory name on the external storage device 1108 of the corresponding client machine A 1101.

For example, if the file or directory name is determined in correspondence with the location under the home directory of the user, the home directory of the user as the request source must be specified. For this purpose, the user name is used. Alternatively, the file or directory name may be determined with reference to a specific file which is located on the home directory of the user and describes its determining method.

In either case, after the file or directory on the client side is determined in this way, the same result can be obtained by the same subsequent processing as that in the first embodiment.

The processing executed when the flow has reached the check-in processing (step S1208) or check-out processing (step S1209) will be explained below. The processing contents are substantially the same as those described in the first embodiment with the aids of FIGS. 7 and 9, except for the processing in steps S702, S703, S705, S706, S901, and S902.

Only the different steps will be described below.

When the update check-in window is displayed in step S705, the first embodiment does not use any default values for change contents of that window. For this reason, the user must input change contents every time he or she checks in a file. However, in this embodiment, data with the user name extracted in step S1213 is obtained from those in the user context holding unit 104 as a default value of that item, and the value "check-in change contents" of the fetched data is used as the default value. In this process, the user can confirm the set default value on the update check-in window, and can rewrite it if needed.

In step S706, the proxy server checks in a file. Upon checking in a file in the CM server, the user who checks it in is the one with the user name extracted in step S1213. Since user P has started the proxy server 100, the CM server recognizes that user P has checked in the file unless such operation is made.

The character string of the change contents designated on the update check-in window is saved in data "check-in change contents" with that user name in the user context holding unit 104. The subsequent processing in steps S704 to S1210 is the same as that in the first embodiment.

The same applies to the processing operations in other different steps S702, S703, S901, and S902. That is, the data in the user context holding unit 104 is used as the default value presented to the user on the setup window which is displayed by the setup window controller 106. After the access to the CM server, the setup value set on the setup window in practice is written in the user context holding unit 104.

Even when accesses from only one user are managed as in the first embodiment, the context data of such user can be managed and used like in the second embodiment, although there are no context entries for a plurality of users.

<Third Embodiment>

The third embodiment to be described below uses "send back local file" and "insert explanatory message" in the user context holding unit 104 described in the second embodiment. These two items respectively means the ON/OFF states of functions:

whether or not a file in the local disk is to be sent back; and whether or not the explanatory message is inserted at the beginning or end of the file upon sending back the local file.

Since this embodiment is substantially the same as the second embodiment except for some portions, only differences will be explained below with reference to FIG. 14. The processing operations in steps S1201 to S1202 are the same as those in the second embodiment. In step S1206, the processing name is extracted from the request. The processing executed when the processing name is one of the following four names will be explained below:

local-on
local-off
dscrpt-on
dscrpt-off

In this case, the flow advances from step S1206 to step S1215. In step S1215, the following processing is executed.

If the processing name is local-on or local-off, the value of the content data item "send back local file" of the data having as an entry the user name of the user who issued the request is set ON or OFF. Similarly, if the processing name is dscrpt-on or dscrpt-off, the value of the content data item "insert explanatory message" of the data having as an entry the user name of the request source is set ON or OFF.

In either case, no access to another server is made, and data to be sent back in step S1210 is a message generated by the proxy server 100 itself. For example, a message with the contents executed according to the processing, e.g., "the send-back function of a local file is set OFF" and the like, is sent back.

The processing executed when it is determined in step S1206 that the request indicates the data acquisition processing, and the flow advances to step S1207 will be explained below with reference to FIG. 5. In this case as well, only the differences from the second embodiment will be explained.

When the flow advances to step S504, in the second embodiment, if the file is checked out for modification, the flow advances to step S506. By contrast, in the third embodiment, if the item "send back local file" of context data held in the user context holding unit 104 and corresponding to the request source user is ON and the file is checked out for modification, the flow advances to step S506.

Also, if it is determined in step S507 that the item "send back local file" of context data is ON, and the resource is present in the local disk, the flow advances to step S509.

In this manner, no access is made to the local disk and no data other than information on the server directly designated by the request is sent back unless the item "send back local file" of context data is ON. Also, explanatory message data such as "this file is the one that you checked out before", "this file is a local file", and the like are not inserted in data to be sent back in steps S512 and S513 unless the item "insert explanatory message" of context data is ON.

Other processing operations are the same as those in the second embodiment.

In the second and third embodiments, data in the user context holding unit 104 are managed using the user names as entries. However, a certain item may be used as data reflected in all the users. For example, as for two items "send back local file" and "insert explanatory message", the proxy server 100 may have only one setup value for each of these items in place of those in units of users. With this processing, identical setup values can be reflected in all the users who accessed the proxy server 100.

Furthermore, such setup items may be protected. For example, only some specific users may be granted to change setups in practice.

Note that the present invention may be applied to either a system constituted by a plurality of equipments (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, many different protocols can be relayed for clients, and a plurality of pieces of information at a plurality of locations can be acquired without requiring direct operations by client users.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a proxy server function in a client/server system, comprising:

specifying means for receiving a first request that uses a first communication protocol from a client, and specifying a server on the basis of the first request;

determination means for determining a second communication protocol to be used in a communication with the server specified by said specifying means in accordance with that server and the first request;

detection means for detecting information which is insufficient to generate a second request suitable for the second communication protocol to implement request contents included in the first request;

acquiring means for acquiring the detected information from the client;

generation means for generating the second request suitable for the second communication protocol to implement request contents included in the first request, by adding the acquired information to the request contents; and communication means for communicating with the server specified by said specifying means by means of the generated second request that uses the second communication protocol.

2. The apparatus according to claim 1, further comprising a correspondence table for storing communication protocols supported by individual servers in correspondence with the servers, and wherein said determination means determines, as the second communication protocol, a communication protocol, which corresponds to the server designated by the first request in the correspondence table.

3. The apparatus according to claim 2, wherein when the server designated by the first request is not registered in said correspondence table, said determination means determines, as the second communication protocol, the first communication protocol used by the first request.

4. The apparatus according to claim 1, further comprising presentation means for presenting a user interface which requests a user of the client to input at least the insufficient information detected by said detection means, and wherein said acquiring means acquires the information input via said user interface.

5. The apparatus according to claim 4, wherein said presentation means makes a client apparatus, as a source of the request, present the user interface.

6. The apparatus according to claim 1, further comprising providing means for providing a result obtained by said communication means to the client.

7. The apparatus according to claim 6, further comprising acquisition means for, when a resource requested by the first request is not present on the specified server, acquiring the requested resource from a local disk that the client is in possession of.

8. The apparatus according to claim 7, wherein when said providing means provides the resource acquired from the local disk by said acquisition means to the client, said providing means adds information indicating that the resource has been acquired from the local disk.

9. The apparatus according to claim 6, further comprising acquisition means for, when a resource requested by the first request is checked out from the specified server, acquiring the requested resource from a local disk that the client is in possession of.

10. The apparatus according to claim 9, wherein when said providing means provides the resource acquired from the local disk by said acquisition means to the client, said providing means adds information indicating that the resource has been checked out.

11. The apparatus according to claim 10, further comprising a directory table for making a directory on the server correspond to a directory on the local disk, and wherein said acquisition means obtains a directory where the resource is present on the local disk from a directory name of the requested resource with reference to said directory table, and acquires the resource form the obtained directory.

12. The apparatus according to claim 1, wherein the communication means receives a reply to the second request from a server.

13. The apparatus according to claim 1, further comprising:

holding means for holding individual information for a plurality of clients; and specifying means for specifying a client as a source of the request on the basis of identification information included in the first request.

14. The apparatus according to claim 13, further comprising providing means for providing a result obtained by said communication means to the client specified by said specifying means.

15. The apparatus according to claim 14, further comprising acquisition means for, when a resource requested by the request is not present on the server designated by the first request, acquiring the corresponding resource from a local disk of the client specified by said specifying means.

16. The apparatus according to claim 15, wherein when said providing means provides the resource acquired by said acquisition means to the specified client, said providing means adds information indicating that the resource has been acquired from the local disk.

17. The apparatus according to claim 14, further comprising acquisition means for, when a resource requested by the request is checked out from the server designated by the first request, acquiring the requested resource from a local disk that the client is in possession of.

18. The apparatus according to claim 17, wherein when said providing means provides the resource acquired by said acquisition means to the specified client, said providing means adds information indicating that the resource has been checked out.

19. An information processing method for implementing a proxy server function in a client/server system, comprising:

a specifying step, of receiving a first request that uses a first communication protocol from a client, and specifying a server on the basis of the first request;

a determination step, of determining a second communication protocol to be used in a communication with the server specified in the specifying step in accordance with the server;

a detection step, of detecting information which is insufficient to generate a second request suitable for the second communication protocol to implement request contents included in the first request;

an acquiring step, of acquiring the detected information from the client;

a generation step, of generating the second request suitable for the second communication protocol to implement request contents included in the first request, by adding the acquired information to the request contents; and a communication step, of communicating with the server specified in the specifying step by means of the generated second request that uses the second communication protocol.

20. The method according to claim 19, further comprising:
   a correspondence table for storing communication protocols supported by individual servers in correspondence with the servers, and
   wherein the determination step includes the step of determining, as the second communication protocol, a communication protocol, which corresponds to the server designated by the first request in the correspondence table.

21. The method according to claim 20, wherein the determination step includes the step of determining, as the second communication protocol, the first communication protocol used by the first request, when the server designated by the first request is not registered in said correspondence table.

22. The method according to claim 19, further comprising a presentation step, of presenting a user interface which requests a user of the client to input at least the insufficient information detected in the detection step,
   wherein the acquiring step includes acquiring the information input via said user interface.

23. The method according to claim 22, wherein the presentation step includes the step of making a client apparatus, as a source of the request, present the user interface.

24. The method according to claim 19, further comprising the providing step of providing a result obtained in the communication step to the client.

25. The method according to claim 24, further comprising acquisition means for acquiring a resource requested by the first request from a local disk possessed by the client, when the requested resource is not present on the specified server.

26. The method according to claim 25, wherein the providing step includes the step of adding information indicating that the resource has been acquired from the local disk when the resource acquired from the local disk in the acquisition step is provided to the client in the providing step.

27. The method according to claim 24, further comprising acquisition means for acquiring a resource requested by the first request from a local disk possessed by the client, when the requested resource is checked out from the specified server.

28. The method according to claim 27, wherein the providing step includes the step of adding information indicating that the resource is checked out when the resource acquired from the local disk in the acquisition step is provided to the client in the providing step.

29. The method according to claim 28, further comprising a directory table for making a directory on the server correspond to a directory on the local disk, and
   wherein the acquisition step includes the step of obtaining a directory where the resource is present on the local disk from a directory name of the requested resource with reference to said directory table, and acquiring the resource form the obtained directory.

30. The method according to claim 19, wherein the communication step includes receiving a reply to the second request from a server.

31. The method according to claim 19, further comprising:
   a holding step, of holding individual information for a plurality of clients; and
   a specifying step, of specifying a client as a source of the request on the basis of identification information included in the first request.

32. The method according to claim 31, further comprising the providing step of providing a result obtained in the communication step to the client specified in the specifying step.

33. The method according to claim 32, further comprising the acquisition step of acquiring a resource requested by the request from a local disk of the client specified in the specifying step when the corresponding resource is not present on the server designated by the first request.

34. The method according to claim 33, wherein the providing step includes the step of adding information indicating that the resource has been acquired from the local disk when the resource acquired in the acquisition step is provided to the specified client in the providing step.

35. The method according to claim 32, further comprising the acquisition means step of acquiring a resource requested by the request from a local disk possessed by the specified client when the requested resource is checked out from the server designated by the first request.

36. The method according to claim 35, wherein the providing step includes the step of adding information indicating that the resource is checked out when the resource acquired in the acquisition step is provided to the specified client in the providing step.

37. A storage medium storing a control program which controls a computer to implement a proxy server function in a client/server system, said control program comprising:
   code for a specifying step, of receiving a first request that uses a first communication protocol from a client, and specifying a server on the basis of the first request;
   code for a determination step, of determining a second communication protocol to be used in a communication with the server specified in the specifying step in accordance with the server and the first request;
   code for a detection step, of detecting information which is insufficient to generate a second request suitable for the second communication protocol to implement request contents included in the first request;
   code for an acquiring step, of acquiring the detected information from the client;
   code for a generation step, of generating the second request suitable for the second communication protocol to implement request contents included in the first request, by adding the acquired information to the request contents; and
   code for a communication step, of communicating with the server specified in the specifying step by means of the generated second request that uses the second communication protocol.

38. The apparatus according to claim 1, further comprising a memory for storing the sufficient information, wherein said generation means generates the second request by adding the information stored in the memory when the memory stores the insufficient information detected by said detection means.

39. The method according to claim 19, wherein, in the generation step, the second request is generated by adding the information obtained from a memory which stores the insufficient information when the memory stores the insufficient information detected in the detection step.

* * * * *

UNITED STATES PATENT AND TRADEMARK OFFICE
CERTIFICATE OF CORRECTION

PATENT NO. : 6,253,248 B1
DATED : June 26, 2001
INVENTOR(S) : Akiya Nakai et al.

It is certified that error appears in the above-identified patent and that said Letters Patent is hereby corrected as shown below:

Title page,
Item [56], References Cited, OTHER PUBLICATIONS,
""Univorm" should read -- "Uniform --.

Column 3,
Line 51, "servers" should read -- server --; and
Line 52, "to" should be deleted.

Column 4,
Line 28, "httpd" should read -- http --.

Column 6,
Line 9, "name-protocol" should read -- name protocol --.

Column 8,
Line 29, "<A HRF="//" should read -- <A HREF="// --; and
Line 44, "instep" should read -- in step --.

Column 15,
Line 19, "means" should read -- mean --.

Column 18,
Line 10, "form" should read -- from --.

Column 19,
Line 60, "form" should read -- from --.

Signed and Sealed this

Thirtieth Day of April, 2002

*Attest:*

JAMES E. ROGAN
*Attesting Officer*     *Director of the United States Patent and Trademark Office*